UNITED STATES PATENT OFFICE.

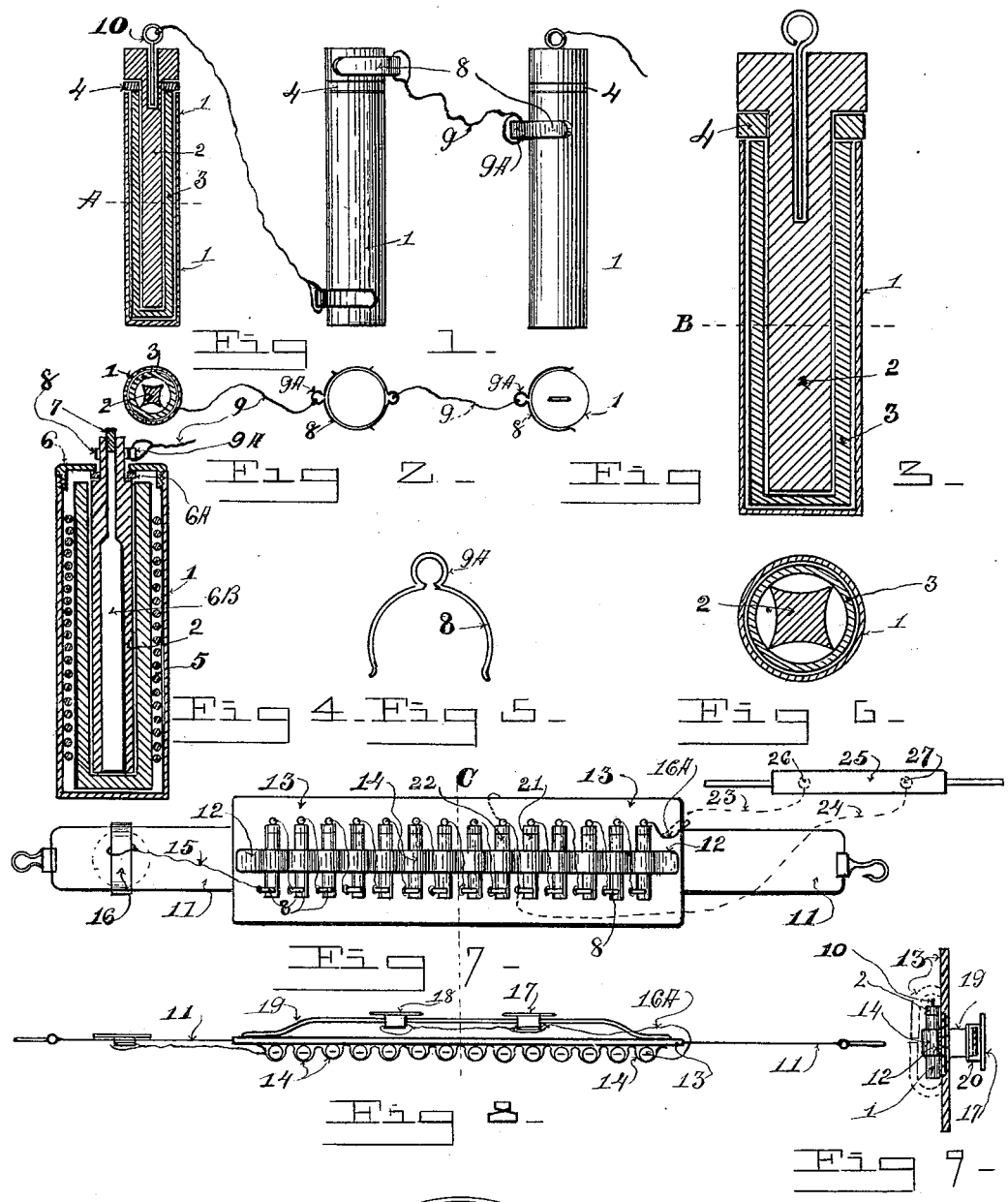

WILLIAM H. I. GEIGER, OF DENVER, COLORADO.

ELECTRIC BELT.

SPECIFICATION forming part of Letters Patent No. 623,659, dated April 25, 1899.

Application filed January 19, 1899. Serial No. 702,733. (No model.)

*To all whom it may concern:*

Be it known that I, WILLIAM H. I. GEIGER, a citizen of the United States of America, residing at Denver, in the county of Arapahoe and State of Colorado, have invented certain new and useful Improvements in Electric Belts; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in electric belts for body wear; and the objects of my invention are, first, to provide a simple electric battery composed of a plurality of independent cells; second, to provide a battery of independent cells that can be divided and subdivided into two or three or more independent batteries; third, to provide a battery composed of independent cells, each of which is adapted to contain an exciting-liquid solution or an exciting-liquid-absorbent element, and, fourth, to provide a simple and strong electrical body battery and belt for medicinal purposes. I attain these objects by the mechanism illustrated in the accompanying drawings, in which—

Figure 1 designates a group of three cells connected in series, one of which is shown in section. Fig. 2 is a plan view of Fig. 1 and shows a cross-section of the cell shown in sectional elevation on line A. Fig. 3 is an enlarged sectional elevation of a cell. Fig. 4 is a sectional elevation of a cell arranged to hold an exciting fluid. Fig. 5 is a plan view of the spring clamping-electrode which I preferably use to connect the cells up into batteries. Fig. 6 is a cross-section of Fig. 3 on line B. Fig. 7 is an elevation of my improved battery and belt. Fig. 8 is a longitudinal edge view of Fig. 7. Fig. 9 is a cross-section of Figs. 7 and 8 in line C, and Fig. 10 is a plan view of a cell of oval form.

Similar figures of reference refer to similar parts throughout the several views.

My improved battery is composed of a series of independent cells, each of which is constructed in the following manner: A circular or oval shell or tube 1 forms the body of the cell. This tube forms the cathode of the cell and may be made of any suitable material, but is preferably made of copper. Its lower end is closed. In this shell I place a rod 2 of any suitable material that will form the anode or positive element of the cell, using, preferably, zinc. I preferably use a square-shaped rod and concave its sides slightly, as shown in Fig. 6, in order to form a space between its sides and the absorbent sleeve 3, that surrounds it. This rod extends to or close to the bottom of the shell, and its upper end extends beyond it and is provided with a shoulder which receives an insulating-washer 4 between it and the shell. The absorbent sleeve 3 may be made of any suitable material, such as felt, that will absorb and hold an exciting fluid, such as diluted acid. It is adapted to fit tight around the rod 2 and to fill the shell tight enough to hold the absorbent and the rod firmly and securely within it and against the insulating-washer. When it is desired to construct a battery that will hold a liquid solution in addition to or instead of an absorbent sleeve, I arrange the cell as shown in Fig. 4, in which arrangement I coil around the absorbent a conductive wire 5. This coiled wire forms, with the shell, the cathode of the cell. To the top of the shell a cap 6 is threadedly secured. The zinc rod projects loosely through the cap and is reduced to form a shoulder on which is placed an insulating and packing washer 6$^A$, which is pinched between the cap and shoulder and makes a liquid-tight joint. In this view I show the zinc with a hole 6$^B$ axially through it to lighten it, in which I place a plug 7 at the external end of the zinc. The exciting solution can be supplied to the absorbent through this hole. For coupling the cells together into a battery I preferably use a spring clamping clip or electrode 8, which consists of a yoke-shaped narrow band of resilient conductive material which is arranged and adapted to resiliently clamp itself around the shell by its elastic tension. A circuit-wire 9 is secured to a loop 9$^A$, formed at the center of the loop at one end, and at the opposite end is attached a similar electrode or to a pin 10, which fits tight in a hole formed in the top of the zinc. The cells are mounted on a band 11 of any suitable fabric, which is provided at its ends with a hook and eye or with any other suitable means for securing it around the body. A strip 12 is secured to a covering 13, which is secured to the band and is wide enough to fold over the cells of the battery, as shown in dotted lines in Fig. 9. The strip 12 is secured to the covering in such a manner that it forms a consecutive row of loops 14, in each of which a cell is placed, the strip being secured to the covering between each loop. The cells are then coupled into a battery by the circuit-wires and their electrodes, which are simply pushed over the copper shell and zinc elements, or if a pin is used at one end of the circuit-wires it is placed in the zinc, and the clamping-clip is placed on any part of the length of the copper shell. From one end of the battery a conductive wire 15 extends from the cathode or shell of the cell to an electrode 16, which is slidably attached to the adjacent end of the belt, and from the anode or positive element of the cell at the opposite end of the battery a conductive wire 16^A leads to two similar electrodes 17 and 18, which are slidably secured to a strap 19 by means of a loop extension 20 on the back of the electrodes, through which the strap passes. The strap is secured at its ends to the back of the covering and band. The cells are thus easily and quickly coupled together into a battery, and they can also be as easily separated and divided into two or three batteries, and two or three applications can be made at the same time to different parts of the body. Thus if while the battery and belt are worn around the waist it is desired to apply a current to one of the knees, legs, or arms it is only necessary to uncouple several of the cells from the rest—for example, the cell 21 from 22—and connect the opposite poles of the cells at the end of the smaller group of cells or battery by circuit-wires 23 and 24, which are shown in dotted lines, to a supplementary belt or band 25, which is simply provided with electrodes 26 and 27, which can be secured where desired, while the remaining cells, which constitute the larger battery, can be coupled to the electrodes at the back of the large belt, the same as the cell at the end of the battery now does, by the wire 16^A, which is shown in dotted lines coupled to the cell 21 and leading back of the belt.

My improved electric belt is simple and develops a steady current of more than usual strength for a long time without recharging the absorbent or resupplying the cell with exciting fluid in case fluid is used, and the cells are so simple in construction that they can be easily taken apart and cleaned.

Having described my invention, what I claim as new, and desire to secure by Letters Patent, is—

1. An electric belt comprising a plurality of cells each consisting of a tubular, voltaic element closed at its lower end, a rod comprising an opposite voltaic member inserted in said tubular member and extending beyond it, an exciting-fluid-absorbent element surrounding said rod element and filling the interior of said tubular member, an insulating-washer between said tubular shell and said rod and a spring clamping-clip secured to the ends of a conducting-wire and adapted to fit resiliently on the surface of said tubular member of one cell and on the external portion of the rod member of the adjacent cell whereby the said cells are coupled in series, into a battery, substantially as described.

2. The combination in an electric belt, of a battery comprising a plurality of independent voltaic cells coupled together and each consisting of a negative element comprising a tube of any suitable form of cross-section and closed at its lower end, a cap threadedly secured to its upper end, a hole axially through said cap, a positive element comprising a rod extending loosely through said cap into said tube, a reduced portion and a shoulder on said rod adjacent to said cap, an insulating-washer between said shoulder of said rod and said cap, an absorbent element comprising any suitable material, as felt, surrounding said rod in said tube, a conductive wire surrounding said absorbent element and in contact with the interior surface of said tube, and means including spring clamping-electrodes and conductive wires for coupling the cells into a battery, substantially as described.

3. The combination in an electric belt, of the copper tubes having a closed bottom, the zinc rod centrally suspended in the center of said tube and extending beyond its open end and having a hollow center, the absorbent fabric surrounding said rod, the insulating-washer between the upper end of said tube and said rod; a conductive wire; detachable spring clamping-electrodes arranged to be resiliently attached to said tubes at opposite ends of said conductive wire, a body-band; means secured to said band for securing it to the body, a covering for the battery secured to said band, a looped strip of suitable material secured to said covering, a second strip secured to said covering or band on the opposite side of said covering from said battery; electrodes slidably secured to said strip and conductive wires operatively connecting said electrodes and batteries, substantially as described.

4. The combination in an electric belt, of the copper tubes, the zinc rods; the absorbent members and the insulating-washers detachably coupled into a battery, with the belt comprising the band, the covering; the looped strip; the electrode-supporting strip; the electrodes and the conductive wires connecting said electrodes and battery together, substantially as described.

5. The combination in an electric belt, of the battery-cells consisting of copper tubes, zinc rods extending into said tubes and having one end project beyond said tube; a hole axially through said zinc rod, a shoulder on the extending end adjacent to the end of said tube and an insulating-washer between said shoulder and the top of said tube, substantially as described.

6. The combination in an electric belt, of the battery comprising a plurality of independent cells each consisting of the copper tube; the zinc rod; the absorbent element; the insulating-washer; the conductive wires and spring clamping-electrodes, with the band, the looped strip for holding the cells and battery and the electrodes and connecting-wires, substantially as described.

7. The combination in an electric belt, of the battery comprising a plurality of independent cells each consisting of a solution or absorbent containing copper tubes adapted to constitute the cathode or negative element of the cell closed integrally at one end, a zinc rod extending into said tube and adapted to form the positive or anode element of said cell, an absorbent body of any suitable material surrounding said zinc rod and saturated with a current-exciting fluid and an insulating-washer between the entrance end of the tube and the zinc rod, with a coupling-electrode consisting of a wire having at each end an elastic clamping-clip adapted to fit removably on the tube and zinc rod, and with a body-belt comprising a flexible band having hook-and-eye attachments arranged to secure it around the body, a covering-strip secured to said band and provided with a strip formed into a plurality of loops, each of which is arranged and adapted to receive a cell of the battery, a second strip secured at its ends to the back of said covering and band and free at its middle portion; electrodes slidably secured to said strip; an electrode slidably secured at one end of said band and independent of the electrodes at the back of said band, and electric connection between said battery and said electrodes, substantially as described.

8. In an electric belt the combination of a battery having a plurality of independent cells comprising the tube; the zinc rod; the absorbent covering for said rod and the insulating-washer, the cap and the wire coiled around the absorbent member, with the coupling-wire and the spring clamping-clips comprising a narrow band of conductive spring metal of semicircular outline arranged to resiliently clamp to the said tube and rod by means of its elastic tension and arranged to be instantly connected to or detached from said tubes and rods of the cells of said battery and a body-belt of any suitable construction arranged to support said battery and containing electrodes slidably attached thereto and operatively connected to said belt, means for dividing said battery into two or more independent batteries, one or more supplementary belts, means for supplying the supplementary belt or belts from the battery or batteries, formed by dividing the whole battery of the main belt into two or more batteries and at the same time supply the main belt and body from the remaining battery of the main belt, substantially as described.

9. The combination with the copper tubes, the zinc rods; the absorbent member surrounding said rods; and the insulating-washer, with the coupling-wires having a spring clamping-clip at one end adapted to be manually sprung onto the body of said tube and a pin or a spring-clamp at the opposite end arranged to electrically connect with the zinc rod, substantially as described.

10. The combination in an electric belt, of the battery comprising the cells, the coupling-wire and spring contact-clips with the band, the battery-covering secured to said band, means for securing said battery to said band and covering, body contact-electrodes slidably connected to said belt and electrically connected to said battery, one or more supplementary bands having body contact-electrodes secured to them and means for cutting and dividing said batteries into two or more independent batteries and for supplying the supplementary belt or belts from the battery or batteries formed by dividing the whole battery of the main belt and at the same time supply the body from the remaining battery of the main belt, substantially as described.

In testimony whereof I affix my signature in presence of two witnesses.

WILLIAM H. I. GEIGER.

Witnesses:
CHARLES F. FURY,
CLAUD A. DUNN.